Oct. 1, 1957

W. A. HUNTER 2,808,120

HYDRAULIC POWER STEERING UNIT WITH VALVE
REACTION ELEMENTS OF UNEQUAL AREA

Filed June 23, 1953

INVENTOR.
William A. Hunter
BY
Harness and Harris
ATTORNEYS.

United States Patent Office 2,808,120
Patented Oct. 1, 1957

2,808,120

HYDRAULIC POWER STEERING UNIT WITH VALVE REACTION ELEMENTS OF UNEQUAL AREA

William A. Hunter, Highland Park, Mich., assignor to Chrysler Corporation, Highland Park, Mich., a corporation of Delaware Application June 23, 1953, Serial No. 363,458

4 Claims. (Cl. 180—79.2)

This invention relates to power steering boosters for use on wheeled vehicles. More particularly, this invention comprises a novel fluid motor and control valve arrangement to provide a power assist to supplement the manual turning effort which is imparted to the steering linkage of the vehicle.

In general, the present invention includes a linkage interconnecting the steering arms of the vehicle wheels. A manually operated steering shaft is drivably connected to the linkage through a fluid cylinder and valve housing. The movement of the steering shaft is effective to transmit a steering motion to the linkage and also to actuate a sliding valve element inside the valve housing thereby permitting high pressure fluid to pass therethrough into one end of the fluid cylinder. The high pressure fluid is effective to exert a supplementary turning effort upon the linkage to which it is attached. The reaction for this supplementary turning effort is absorbed by a piston element within the fluid cylinder which is fixed by means of a piston rod to a portion of the frame of the vehicle.

An important feature of the present invention is the provision of a pressure reaction element within the valve housing which will be effective to transmit a reaction force to the manually actuated steering shaft in opposition to the manual turning effort. One such reaction element is provided on each end of the sliding valve element to provide a so called "feel back" when turning the vehicle in either direction.

High pressure fluid is transferred through the valve element to one side of the piston in the fluid cylinder for turning in one direction and to the other side of the piston for turning in the other direction. Since the cross sectional area of the piston rod extending from one side of the piston is effective to reduce the total working area over which the fluid may act, the amount of the hydraulic power assist will be greater when the vehicle wheels are being turned in one direction than when they are turned in the other direction. Therefore, it is necessary to exert a smaller manual turning effort while turning in the one direction than while turning in the other direction in order to obtain an equal total turning effort in both directions. The degree of this difference between the manual turning effort requirements is sufficient to compensate for the difference in the hydraulic boost due to the cross sectional area of the piston rod.

It is desirable to have the same degree of reaction or pressure "feel back" in the steering arm and steering wheel of the vehicle when the vehicle wheels are being turned in either direction. Accordingly, the reaction elements in the valve housing at either side of the sliding valve element are provided with a working area differential so that the "feel back" through the steering shaft experienced by the operator of the vehicle will be equal during turning maneuvers of the vehicle in either direction even though the ratio of the manual turning effort to the total turning effort will be greater for a turn in one direction than for a turn in the other direction.

In accordance with the above description, a primary object of the present invention is to provide a power boost mechanism for a vehicle steering linkage having a pressure "feel back" through a manually operated steering shaft which is dependent upon and proportional to the total turning effort of both the manual and power assist components.

Another object of the present invention is to provide a power boost mechanism for a vehicle steering linkage which includes a fluid motor power cylinder and piston and an actuating fluid control valve associated therewith which will enable the operator of the vehicle to experience identical sensations of "road feel" for turns in either direction thereby enabling the operator of the vehicle to promptly respond to varying road conditions.

Another object of the present invention is to provide a power boost mechanism for a vehicle steering linkage which will provide identical steering characteristics for turning maneuvers in either direction and which will tend to automatically assume a neutral or intermediate condition when the manual turning effort ceases.

Other objects of the invention will become apparent from the following specification, the drawings relating thereto, and from the claims hereinafter set forth.

For a more complete description of the present invention, reference will be made to the accompanying drawings in which:

Figure 1A is a subassembly view of a portion of the vehicle steering mechanism;

Figure 1:
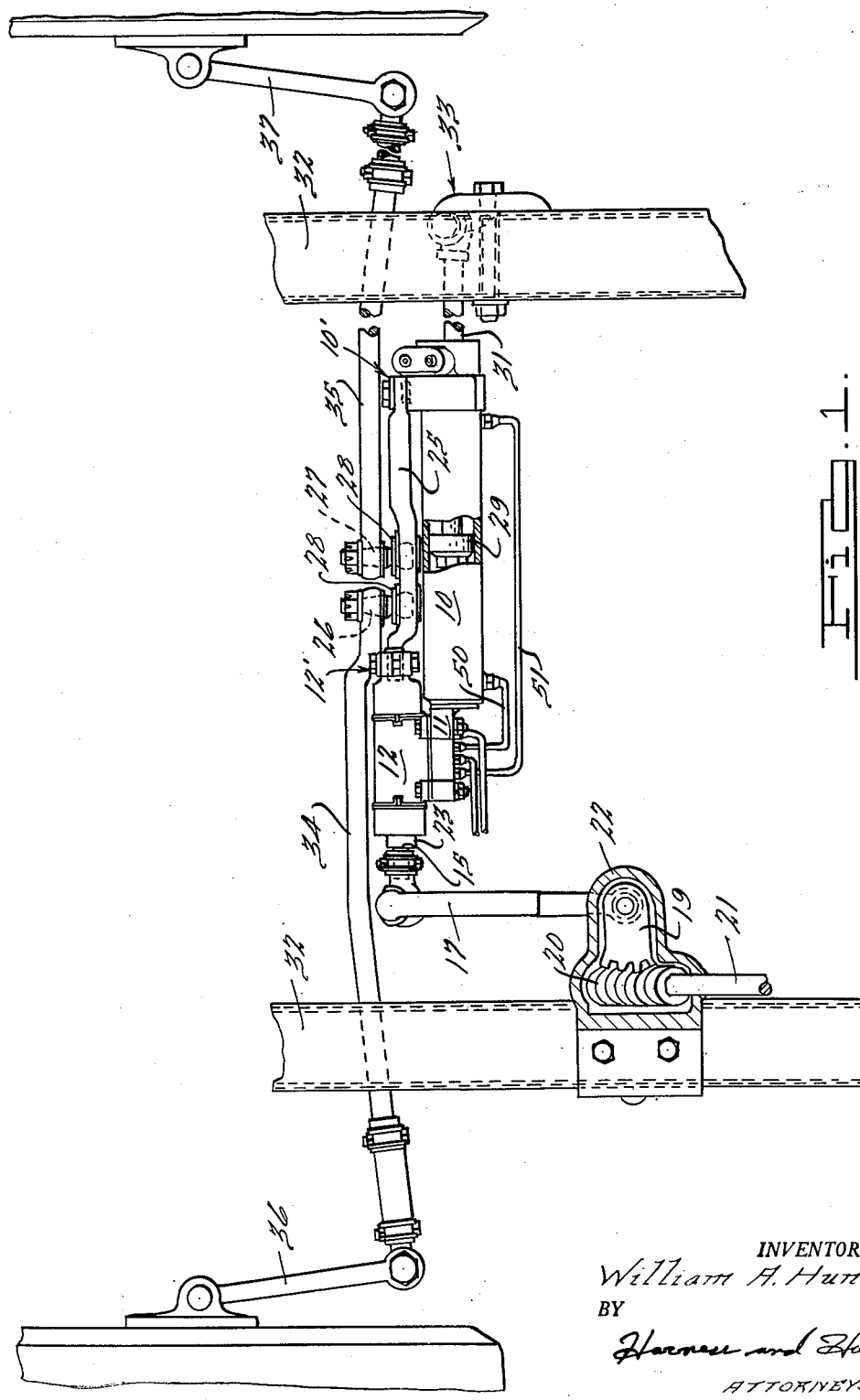
Figure 1 is an assembly view showing the power boost device and its associated control valve mounted in a vehicle steering mechanism.
Figure 2:
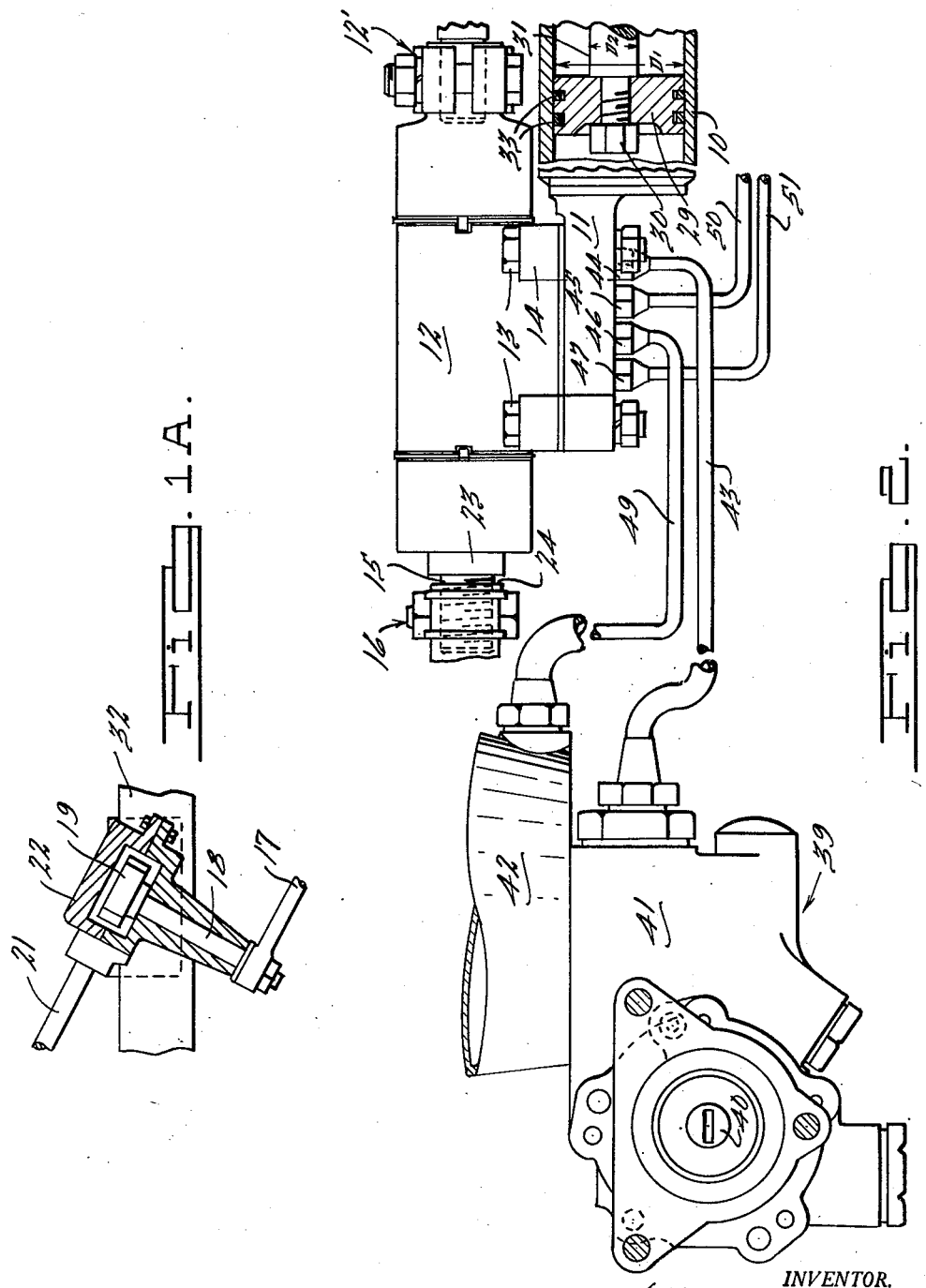
Figure 2 is a view showing the relationship between the fluid pressure pump and the power boost device.

Having reference first to the assembly shown in Figures 1 and 2, the power cylinder for the power boost device is designated by numeral 10. A bracket 11 may be secured by means of weld metal to one end of the power cylinder 10 and it is adapted to carry thereon a valve housing 12. The valve housing 12 is fixed to the bracket 11 by bolts 13 which extend through the bracket 11 and appropriate shoulders 14 formed on the valve housing 12.

An externally threaded rod portion 15 is extended axially from the valve housing 12 at one end thereof and has fixed thereto, by means of a suitable adapter 16, one end of a pitman arm 17. The arm 17 has a transversely extended shaft 18 formed at one end thereof, as seen in Figure 1A, which carries a worm gear segment 19. A steering worm 20 is adapted to drivably engage the segment 19 and thereby impart an oscillatory motion to arm 17 upon rotation thereof in either direction. A steering shaft 21 is secured to the worm 19 at one end and is adapted to carry thereon a steering wheel which is positioned within the interior of the vehicle in the usual manner. The shaft 17, segment 18 and the worm 20 are housed within a suitable casting 22 which may be secured to the frame of the vehicle as seen in Fig. 1. A rubber bushing 23 surrounds the shaft 15 between the value housing 12 and a radial shoulder 24 on the adapter 16.

An axially extending shaft 25 is securely fixed to one end of the valve housing 12 at 12' and to the remote end of the power cylinder 10 at 10'. At an intermediate point on the shaft 25 a pair of depending lugs are formed within which anchor members 26 and 27 are held by means of resilient grommets 28.

A piston element 29 is disposed within the power cylinder 10 and is secured by means of a suitable threaded connection 30 to an axially extending piston rod 31. Piston rings 33 are provided to maintain a sealing engagement between the interior wall of the cylinder 10 and the piston element 29.

The piston rod 31 has a diameter $D_2$ which is substantially smaller than the diameter $D_1$ of the interior of the cylinder 10. The end of the power cylinder 10 remote from the valve housing 12 is suitably apertured to slidably receive the axially extending piston rod 31. The end of the rod 31 is secured to the frame 32 of the vehicle as shown at 33.

The anchor members 26 and 27 are secured to the ends of the rods 34 and 35 respectively as shown in Figure 1. The opposite ends of the tie rods 34 and 35 are joined to the steering arms 36 and 37 respectively and are adapted to impart a steering torque thereto when moved transversely with respect to the frame 32.

A pump housing is shown generally at 39 in Figure 2 and it comprises a pump rotor portion having a rotor shaft 40, a control valve portion 41 and a reservoir portion shown at 42. The rotor shaft 40 may be conveniently driven by providing a connection between one end thereof and the armature shaft of the engine generator, not shown.

A high pressure conduit 43 interconnects the pump outlet and a fluid pressure fitting 44 on the bracket 11. A low pressure conduit 49 interconnects the reservoir 42 and a fitting 46 on bracket 11. A conduit 50 connects a fitting 45 with the interior of cylinder 10 to the left of the piston element 29 and a conduit 51 connects a fitting 47 with the cylinder 10 to the right of the piston element 29.

Figure 3:
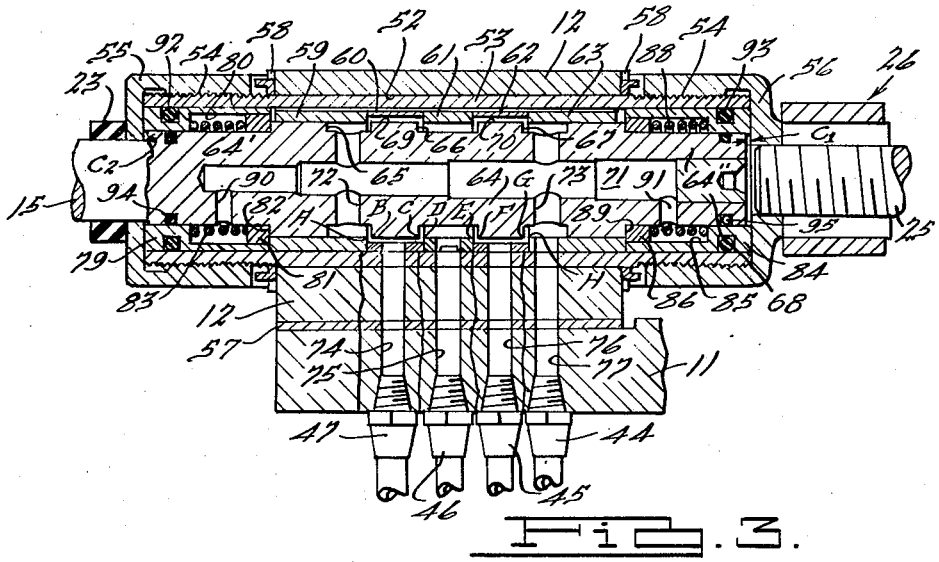
Figure 3 is a cross sectional view of the control valve for the power boost device.
Figure 4:
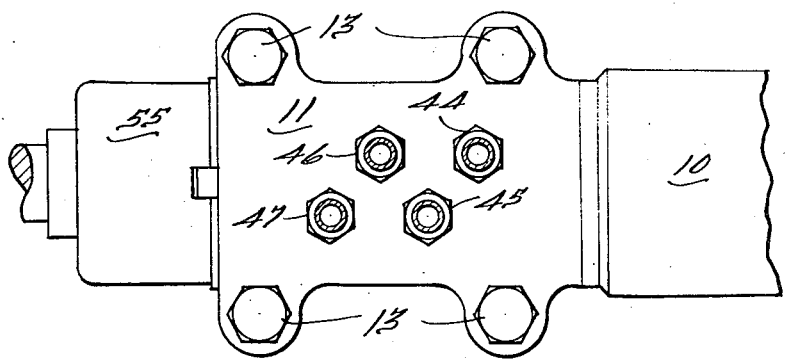
Figure 4 is a plan view of the control valve of Figure 3.

Referring to Figure 3, the control valve is shown in detail. The housing 12 is secured to the bracket 11 as previously described. Suitable gasket material 57 is interposed between the adjacent surfaces of the members 11 and 12. The housing 12 is bored at 52 and receives therein the cylindrical member 53 which has external threads 54 at either end thereof. End members 55 and 56 are formed to threadedly receive the left and right threaded ends respectively of the member 53. Suitable fluid seals 58 may be provided to prevent leakage of fluid between the housing 12 and the member 53.

A series of rings 59, 60, 61, 62 and 63 are disposed within the member 53 with their axial ends in abutting coaxial relationship. A spool or valve element 64 is slidably disposed within the coaxial rings 59 through 63. The internal diameters of the rings 60 and 62 are slightly greater than the internal diameter of the adjacent rings 59, 61 and 63. The valve element 64 has formed about the periphery thereof three axially spaced grooves 65, 66 and 67 which are positioned directly under the rings 59, 61 and 63 respectively. Annular valve surfaces, which are shown at 69 and 70, are disposed directly under the rings 60 and 62. The axial length of the surfaces 69 and 70 are slightly shorter than the axial length of the rings 60 and 62, respectively.

The spool or valve element 64 is centrally bored as shown at 71. Radial passages 72 and 73 interconnect the bore 71 and the grooves 65 and 67 respectively. A suitable plug 68 is adapted to close the end of the bore 71 and is secured therein by means of a press fit.

Passages 74, 75, 76 and 77 connect the fittings 47, 46, 45 and 44 respectively with the interior of the coaxial rings within the member 53 and are in alignment with apertures formed in the rings 60, 61, 62 and 63 respectively.

The ends of the valve element 64 are reduced in diameter as shown at 64' and 64". A small clearance is provided between the end portion 64" and the member 56 at $C_1$ and also between the end portion 64' and the member 55 at $C_2$. A spacer ring 79 is centrally bored and receives therein the end portion 64' of the valve element 64. The axial ends of the spacer ring 79 abut against the end member 55 and the adjacent ring 59. A counterbore 80 is formed within the spacer ring 79 thereby providing an annular space between the end portion 64' of the valve element 64 and the inner wall of the spacer 79. A reaction ring 81 is fitted within this annular space and is biased against a shoulder 82 formed on the valve element 64 by a spring 83. The spring 83 is seated upon the spacer ring 79.

The opposite end 64" of the valve element 64 is surrounded by another spacer ring 84 having axial ends which abut the end member 56 and the adjacent ring 63. The spacer ring 84 is also counterbored as at 85 to form an annular space about the end 64" within which a second reaction ring 86 is disposed. A spring 88 is seated upon the spacer ring 84 and is adapted to bias the reaction ring against a shoulder 89 formed on the valve element 64. The outside diameter of reaction ring 86 is slightly smaller than that of reaction ring 81.

Radial passages 90 and 91 are formed in the valve element 64 interconnecting the bore 71 with the annular spacer in back of the reaction rings 81 and 86 respectively. Suitable sealing means such as O-rings may be provided as shown at 92, 93, 94 and 95 to prevent fluid from escaping from around the inner and outer periphery of the spacer rings 79 and 84.

The operation of this invention is as follows:

The pump 39 is effective to maintain at all times a regulated pressure in conduit 43. For the purpose of more conveniently describing the path followed by the fluid, the edges of the rings 59, 61 and 63 and the edges of the valve surfaces 69 and 70 will be designated by the letters A through H as shown in Figure 3.

During normal "straight ahead" driving of the vehicle the fluid will flow from conduit 43 through passage 77, through the annular opening between edges G and H, through the annular opening between edges E and F and then into passage 75 which leads to conduit 49 and the reservoir 42. Another portion of the fluid passes through passage 77, through passage 73 into bore 71, through bore 72, through the annular opening between the edges A and B, through the annular opening between edges C and D and then into the passage 75. Very little fluid will flow into passages 74 and 76 since each of these conduits leads to one end of the cylinder 10 which has no fluid outlet.

During a turning maneuver of the vehicle in the right hand direction the pitman arm 17 is caused to move counterclockwise, as viewed in Figure 1, by manually turning the vehicle steering wheel. This causes the valve element 64 to shift slightly to the left with respect to the coaxial rings 59 through 63, as viewed in Figure 3, until the clearance $C_2$ is reduced. This shifting motion causes the annular spaces between edges C and D and between edges G and H to increase in size and also causes the annular spacers between edges A and B and between E and F to decrease in size. Accordingly, high pressure fluid from conduit 43 will now pass through passage 77 directly into passage 76 through the annular spaces between edges G and H. From passage 76 the fluid passes through line 50 to the fluid cylinder 10 to the left of the piston element 29. The fluid within the fluid cylinder to the right of the piston element 29 is in communication with passage 74 through conduit 51. Passage 74 in turn is in communication with the outlet passage 75 through the annular space between edges C and D. The outlet passage 75, as previously pointed out, is in communication with the low pressure reservoir 42 through conduit 49. The consequent pressure build up in the left end of the cylinder 10 and the reduction in pressure in the right end of cylinder 10 is effective to move the cylinder 10 to the left, as viewed in Figure 1, with respect to the piston element 29 and the vehicle frame. The valve body 12, bracket 11 and shaft 25 will move in a transverse direction together with the cylinder 10 since these parts are integrally assembled. A transverse motion is also imparted to the tie rods 34 and 35 by virtue of the resilient connection of the tie rod ends with the shaft 25. The steering arms 36 and 37 are thereby caused to turn in a clockwise direction which results in a right hand turn of the vehicle.

To accomplish a left hand turn of the vehicle a clockwise steering torque is applied to the pitman arm 17 which causes the valve element 64 to shift slightly to the right thereby reducing the clearance $C_1$ between the end portion 64'' and the member 56. This will increase the size of the spaces between edges A and B and between edges E and F and will decrease the size of the spaces between edges C and D and between G and H. This will cause the high pressure fluid to pass from passage 77 through passage 73 to the bore 71, through passage 72 and then to passage 74 through the space between edges A and B. From passage 74 the fluid passes to the right end of cylinder 10. At the same time the left end of the cylinder 10 is being exhausted through the annular space between edges E and F.

During a turn in either the left or the right hand direction, either the reaction ring 81 or the reaction ring 86 is caused to move with the valve element 64 as it undergoes axial displacement with respect to the housing 12. The high pressure fluid within the axial bore 71 is caused to exert a pressure against each of the reaction rings 81 and 86 by virtue of the passages 90 and 91 extending radially from the bore 71.

When the valve element 64 is shifted to the right during a turning maneuver in the left hand direction the pressure reaction against reaction ring 81 is absorbed by the housing 12 by virtue of the abutting relationship between the ring 81 and the adjacent ring 59. The pressure reaction against the reaction ring 86 is absorbed by the valve element 64 since the reaction ring 86 is seated upon shoulder 89 on valve member 64. This latter pressure reaction tends to return the valve element to its intermediate or neutral position and is effective to provide the operator of the vehicle with "road feel."

When the valve element is shifted to the left during a turning maneuver in the right hand direction, the pressure reaction on the reaction ring 86 is absorbed by the housing 12 by virtue of abutting relationship between the ring 86 and the adjacent ring 63. The pressure reaction against the reaction ring 86 is absorbed by the valve element 64 and is effective to provide a "feel back" or "road feel" as previously described.

Since the total steering effort is equal to the sum of the manual turning effort and the power assist, any variation in the amount of the power assist will call for a corresponding variation in the manual turning effort in order to maintain a uniform total steering effort. Since the effective working area for the fluid in the cylinder 10 to the right of the piston element 29 is less than the effective working area to the left of the piston element 29 by virtue of the cross sectional area of the piston rod 31, it necessarily follows that the amount of the power assist which may be obtained for a turn in the right hand direction will be greater than that which may be obtained for a turn in the left hand direction assuming the fluid pressure is the same in both cases. The ratio of the power assist in either case is directly proportional to the square of the ratio of the inside diameter of cylinder 10, to the inside diameter of cylinder 10 minus the diameter of the rod 31.

In order to keep the total turning effort in one direction equal to the total turning effort in the other, then a slightly greater manual component will be reuired while turning in one direction than in the other. Since it is desirable to maintain constant "road feel" characteristics for a turn in either direction, then it follows that a predetermined differential in pressure reaction will be required. This is accomplished by providing a smaller effective reaction area on the reaction ring 86 than on the reaction ring 81.

Because of the differential pressure reaction on the two reaction rings the portion of the manual turning effort applied to the steering wheel which is absorbed by the pressure reaction is greater and the portion of the manual turning effort transmitted to the steering tie rods is smaller when the vehicle is in a right turn maneuver than in the case of a left turn maneuver. The ratio of the working areas on the reaction rings 81 and 86 is equal to the ratio of the inside cross sectional area of the cylinder 10 to the inside cross sectional area of cylinder 10 minus the cross sectional area of the piston rod 31. The sensation of "road feel" experienced by the operator of the vehicle will therefore be the same for a turn in either direction.

Since the resistance offered to the steering of the vehicle wheels determines the degree of pressure build up within the cylinder, it is thus seen that the "feel back" or "road feel" experienced by the operator will be proportional to the steering requirements.

If the steering requirements are such that the valve element 64 is caused to assume a position which is intermediate of the neutral position and an extreme axially displaced position, then the difference in the power assist for a turn in one direction and for a turn in the other direction is not equal to the difference between the portion of the manual effort being transmitted to the tie rods for a turn in one direction and for a turn in the other direction. Under these conditions the pitman arm 17 will cause the valve element 64 to assume a more extremely displaced position for a turn in one direction than in the other due to the differential reaction areas on the reaction rings. This will cause the pressure build up to be greater for a turn in one direction than in the other. In the particular embodiment herein disclosed, the pressure build up in the right end of cylinder 10 during a left turn will be greater than the pressure build up in the left end of the cylinder during a right turn thus tending to compensate for the reduction in the effective working area by virtue of the piston rod 31.

When the manual steering effort on the steering wheel is terminated, the reaction rings 81 and 86 are effective to return the valve element 64 to the intermediate or neutral position. The conventional caster type suspension of the steered wheels is effective to return the wheels to the normal "straight ahead" position.

It is thus seen that the present invention is effective to enable the operator to control the vehicle with a minimum of effort. The manual turning effort will at all times be proportional to the resistance offered by the wheels to a directional variation. Also the total steering effort will be the same regardless of the direction of the turn. Further, the "road feel" experienced by the driver will be the same regardless of the direction of the turn and will automatically cause a prompt response by the operator to the steering requirements.

While a certain preferred embodiment of the invention has been specifically disclosed, it is understood that the invention is not limited thereto as many variations will be readily apparent to those skilled in the art and the invention is to be given its broadest possible interpretation within the terms of the following claims.

I claim:

1. A power steering mechanism for a vehicle having a steering wheel and a steering linkage, comprising a fluid pressure motor provided with housing and piston elements, one being connected to the vehicle, and the other being connected to said steering linkage, a control valve for said motor including a pair of valve members, one being connected for operation by the steering wheel, fluid actuated means for positively locating said one valve member at a neutral position relative to the other valve member when the steering linkage is in straight ahead position comprising a pair of fluid reaction chambers formed jointly in said valve members, each chamber having a pair of wall surfaces comprising abutment surfaces of said valve members and facing oppositely from the pair of wall surfaces of the other chamber, a pair of fluid actuated reaction plungers in said chambers respectively in concurrent abutment with the corresponding pair of abutment surfaces at said neutral position, a fluid conduit system cooperable with said valve and motor to actuate the latter upon relative shifting of said valve members, said system including ports opening into said reaction chambers and connecting the same with a source of pressurized fluid to urge each reaction plunger into said concurrent abutment with said corresponding pair of abutment surfaces, one or the other of said reaction plungers being shiftable by the adjacent abutment surface of said one valve member from the adjacent abutment surface of the other valve member upon shifting of said one valve member in one direction or the opposite respectively from said neutral position, the effective working areas of said one and the other of said reaction plungers within said reaction chambers being unequal to each other and being proportioned to transmit the force of said pressurized fluid to the corresponding abutment surface of said one valve member in an amount proportional to the force applied to said steering linkage by said motor upon said movement of said one valve member in said one direction and the opposite respectively from said neutral position, each abutment wall of said other valve member positively holding the adjacent reaction plunger at the neutral position in opposition to said pressurized fluid in the associated chamber when said one valve member is in the neutral position and also when the other reaction plunger is moved from the neutral position by said one valve member.

2. The combination according to claim 1 wherein said other valve member is connected to said one motor element that is connected to said steering linkage.

3. A power steering mechanism for a vehicle having a steering wheel and a steering linkage, comprising a fluid pressure motor provided with a housing element, a piston reciprocable in said housing element, a rod element secured to said piston and extending from one side thereof through one end of said housing element, one of said elements being connected to said vehicle and the other being connected to said steering linkage, a control valve for said motor including a pair of valve members, one being connected for operation by the steering wheel, fluid actuated means for positively locating said one valve member at a neutral position relative to the other valve member when the steering linkage is in straight ahead position comprising a pair of fluid reaction chambers formed jointly in said valve members, each chamber having a pair of wall surfaces comprising abutment surfaces of said valve members and facing oppositely from the pair of wall surfaces of the other chamber, a pair of fluid actuated reaction plungers in said chambers respectively in concurrent abutment with the corresponding pair of abutment surfaces at said neutral position, a fluid conduit system cooperable with said valve and motor to actuate the latter upon relative shifting of said valve members, said system including ports opening into said reaction chambers and connecting the same with a source of pressurized fluid to urge each reaction plunger into said concurrent abutment with said corresponding pair of abutment surfaces, said system also including two working ports in said valve adapted to be selectively connected with said housing at opposite sides respectively of said piston by operation of said valve, one or the other of said reaction plungers being shiftable by the adjacent abutment surface of said one valve member from the adjacent abutment surface of the other valve member upon shifting of said one valve member in one direction or the opposite respectively from said neutral position, the effective working areas of said one and the other of said reaction plungers within said reaction chambers being unequal to each other and being proportioned to transmit the force of said pressurized fluid to the corresponding abutment surface of said one valve member in an amount proportional to the force applied to said steering linkage by said motor upon said movement of said one valve member in said one direction and the opposite respectively from said neutral position, each abutment wall of said other valve member positively holding the adjacent reaction plunger at the neutral position in opposition to said pressurized fluid in the associated chamber when said one valve member is in the neutral position and also when the other reaction plunger is moved from the neutral position by said one valve member.

4. The combination according to claim 3 and comprising in addition light spring means in each reaction chamber biasing the corresponding reaction plunger into said concurrent abutment when said one valve member is in the neutral position.

References Cited in the file of this patent

UNITED STATES PATENTS

| | | |
|---|---|---|
| 2,063,937 | Kundig | Dec. 15, 1936 |
| 2,608,263 | Garrison | Aug. 26, 1952 |
| 2,676,663 | Smith | Apr. 27, 1954 |
| 2,681,045 | Klessig et al. | June 15, 1954 |
| 2,757,748 | McDuff | Aug. 7, 1956 |